UNITED STATES PATENT OFFICE.

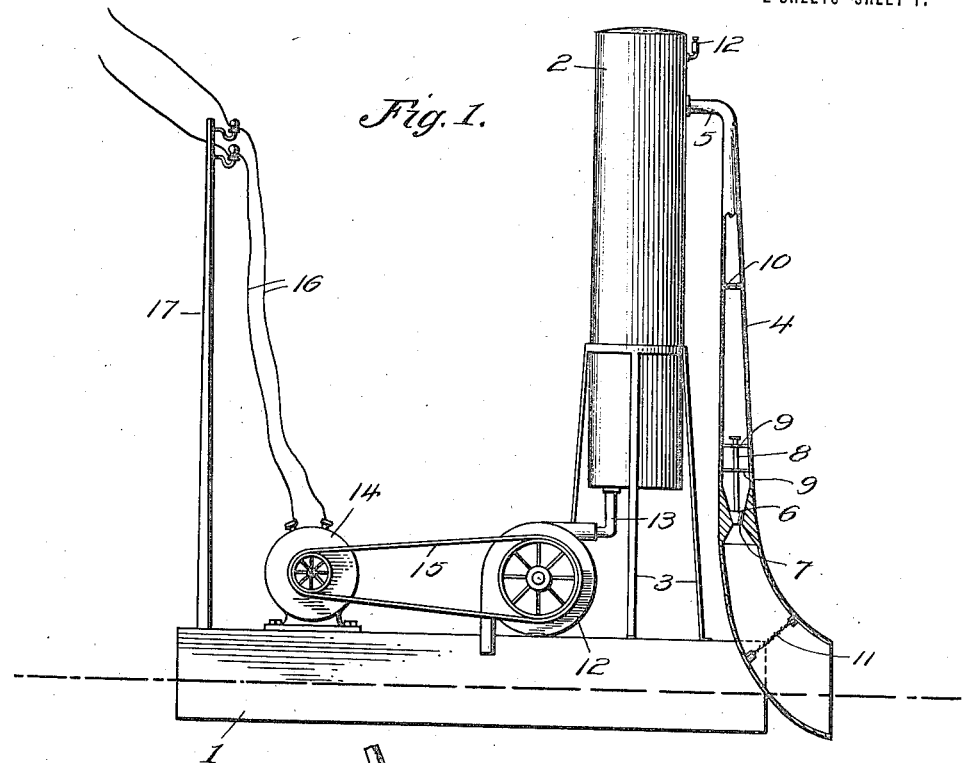
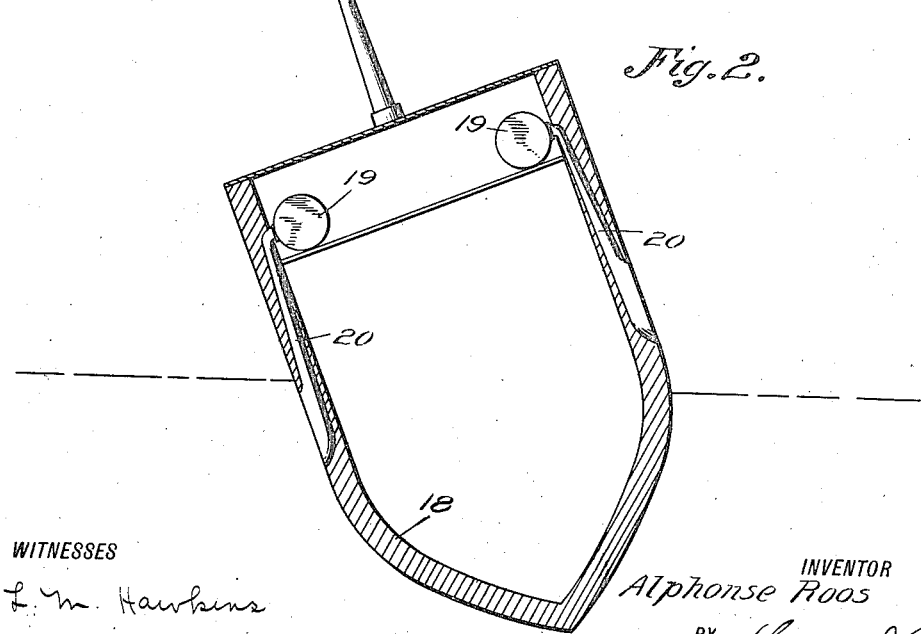

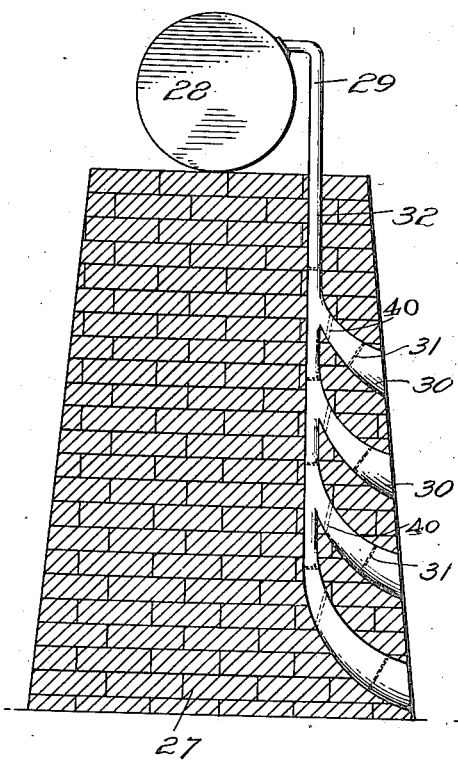
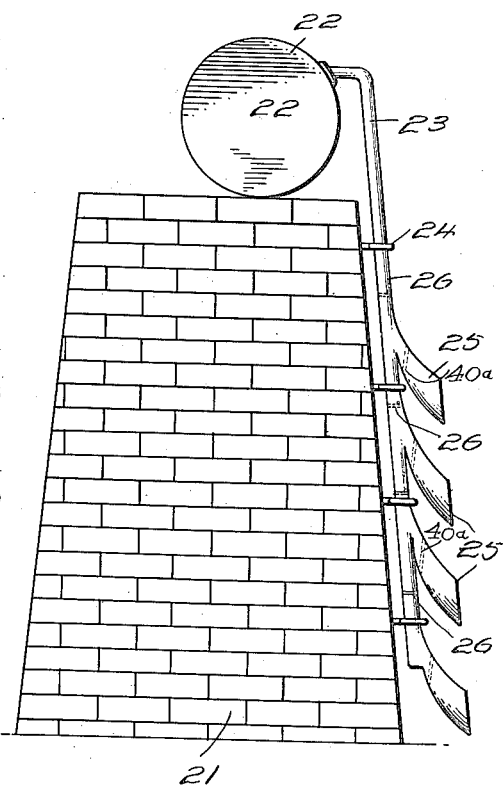

ALPHONSE ROOS, OF CHICAGO, ILLINOIS.

WAVE-MOTOR.

1,306,974.  Specification of Letters Patent.  Patented June 17, 1919.

Application filed September 4, 1918. Serial No. 252,581.

*To all whom it may concern:*

Be it known that I, ALPHONSE ROOS, citizen of France, and a resident of Chicago, in the county of Cook and State of Illinois, have invented certain new and useful Improvements in Wave-Motors, of which the following is a specification.

My invention is an improvement in wave motors, and has for its object to provide a device of the character specified, especially adapted for utilizing the energy of moving water.

In the drawings:

Figure 1 is a diagrammatic view, with parts in section, showing one embodiment of the invention;

Fig. 2 is a transverse vertical section, showing another embodiment;

Fig. 3 is a front view of another embodiment; and

Fig. 4 is a vertical section of another embodiment.

In the embodiment of the invention shown in Fig. 1, a suitable float 1 is provided, and supported by this float is a tank or reservoir 2, the said tank being held above the float by a skeleton superstructure 3. This tank or reservoir has an inlet pipe 4 which is funnel shaped, as shown, the small end of the pipe being connected to the tank or reservoir near its top by an elbow 5. The lower large end of the pipe 4, which is curved outwardly away from the float, is at the bottom of the float, and has its open end in such position that the waves will strike into the said open end, and the mixed air and water will be thrown upward through the pipe 4 and will pass into the tank or reservoir.

A check valve 6 is arranged within the pipe 4, the said valve coöperating with the seat 7, and it is designed to prevent the return of the air and water after it is driven upward by the incoming wave. The valve has a stem 8 which passes through guides 9 in the pipe, and above the valve 6 there is arranged a flap valve 10, the said valve being hinged to the pipe and acting in the same manner as the valve 6.

A screen 11 is arranged near the open end of the pipe 4, and this screen prevents the passage of trash and other solid matter. The tank or reservoir is also provided with a safety valve 12, and the water which separates from the air in the tank and seeks the lowest part thereof is utilized to run a turbine 12, the said turbine being mounted on the float and being connected to the tank or reservoir by a pipe 13. The turbine is connected to a suitable generator 14, by means of a belt 15, and the power generated by the generator may be utilized by means of lead wires 16. In the said instance these wires are supported by a mast 17.

In operation, the incoming waves strike within the open end of the pipe 4 and the air and water mixed are driven upwardly through the pipe with considerable force, passing the valves 6 and 10 which prevent the return of such air and water, and both are trapped in the tank or reservoir. Here the water will drive the turbine, and increased power other than the flow of the water is obtained by the compressed air. The safety valve prevents injury to any of the parts.

In Fig. 2 is shown a construction wherein the swing of the float due to the action of the waves is also utilized or which may be applied to vessels of any character. In this construction the float 18 which is in the form of a vessel is provided with tanks or reservoirs 19, the said tanks or reservoirs being arranged at opposite sides of the vessel and high up within the same. Each tank has a pipe or series of pipes 20 leading therefrom similar to the pipe 4 and which may be similarly arranged, the large ends of the said pipes opening at opposite sides of the vessel. The power generated may be used to drive the vessel or for any other purpose.

In Figs. 3 and 4 are shown constructions adapted to be arranged upon the shore and to utilize not only the force of the waves but the action of the tides. In the construction of Fig. 3 a break water of masonry or the like is provided, and the said break water supports a tank or reservoir 22 of suitable size.

A pipe or series of pipes 23 leads from the tank or reservoir downwardly along the outer face of the masonry, being supported by brackets 24. Each of these pipes has funnel shaped branches 25 which open downwardly and outwardly, having their large ends open and their small ends connected to the pipe 23. Suitable check valves 26 are arranged within the pipe 23, one of the said valves 26 being just above the inlet of each pipe 25, and screens (not shown) are arranged within each of the branches.

In Fig. 4 the break water 27 and the tank 28 are similar to those shown in Fig. 3. A pipe 29 leads from the tank or reservoir downwardly through the masonry near the front face thereof, and this pipe has branches 30 similar to the branches 25. Each branch has a screen 31, and check valves 32 are arranged in the pipe 29 above the inlet end of each branch 30.

The operation in both constructions is the same. When the tide rises the air and water are forced upward into the tank and prevented from returning by the check valve. When the waves strike the open pipes the action is the same as that of the construction shown in Fig. 1.

It will be understood that when the motor is fixed on a fixed support, that is, when the device is stationary, because of high and low tides, a series of branches is necessary. When the device floats, however, but a single opening is needed.

It will be understood that each branch 25 and 30 of the pipes has a check valve 40ª and 40, respectively. These check valves are for preventing the water from passing up one branch at low tide, for instance, and out at an upper branch.

I claim:

A device of the character described comprising a rigidly supported reservoir tank, a substantially vertical pipe communicating with said tank and extending downwardly below the latter, the lower end of said pipe being curved and flared to provide an enlarged entrance opening, a plurality of branches laterally curved and flared to be similar in size and shape to the flared end of said pipe, said branches being arranged in substantially vertical alinement with one another and with the end of said pipe, and a downwardly opening check valve disposed above each branch.

ALPHONSE ROOS.

Witnesses:
J. M. BROWN,
W. S. BORST.